(12) United States Patent
Hild et al.

(10) Patent No.: US 6,978,373 B1
(45) Date of Patent: Dec. 20, 2005

(54) METHODS SYSTEMS AND COMPUTER PROGRAM PRODUCTS FOR PROVIDING SECURE CLIENT PROFILE COMPLETION BY NETWORK INTERMEDIARIES

(75) Inventors: Stefan Georg Hild, Zurich (CH); Sandeep Kishan Singhal, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/533,644

(22) Filed: Mar. 22, 2000

(51) Int. Cl.$^7$ ............................. H04K 1/00; H04L 9/00
(52) U.S. Cl. ...................... 713/182; 380/270; 380/272; 713/193
(58) Field of Search ................. 713/172, 185, 713/201, 179, 193; 380/30

(56) References Cited

U.S. PATENT DOCUMENTS

| | | | |
|---|---|---|---|
| 5,343,493 A | 8/1994 | Karimullah | |
| 5,754,939 A | 5/1998 | Herz et al. | 455/4.2 |
| 5,778,356 A | 7/1998 | Heiny | 707/2 |
| 5,913,030 A | 6/1999 | Lotspiech et al. | 395/200.33 |
| 6,205,553 B1 * | 3/2001 | Stoffel et al. | 713/202 |
| 2001/0020242 A1 * | 9/2001 | Gupta et al. | 707/501.1 |
| 2002/0010776 A1 * | 1/2002 | Lerner | 709/225 |

FOREIGN PATENT DOCUMENTS

| | | | |
|---|---|---|---|
| EP | 0887979 | 12/1998 | H04L 29/06 |
| JP | 235116 | 9/1996 | G06F 15/00 |
| JP | 160876 | 6/1997 | G06F 15/00 |
| JP | 261265 | 10/1997 | H04L 12/46 |
| JP | 051449 | 2/1998 | H04L 12/24 |
| JP | 200571 | 7/1998 | H04L 12/54 |
| JP | 254807 | 9/1998 | G06F 13/00 |
| JP | 265325 | 9/1999 | G06F 13/00 |
| WO | 9963416 | 12/1999 | |

* cited by examiner

*Primary Examiner*—Gilberto Barrón
*Assistant Examiner*—Cas Stulberger
(74) *Attorney, Agent, or Firm*—Myers Bigel Sibley & Sajovec, P.A.

(57) ABSTRACT

Methods, systems and computer program products are provided which provide profile information associated with a client to a server by generating, at the client, a profile document containing profile information associated with the client and incorporating in the profile document a designator which indicates that profile information identified by the designator is not provided by the client and is provided by a network intermediary in a path between the client and the server. The designator in the profile document is encrypted utilizing a key associated with the client and the profile document with the encrypted designator transmitted from the client to the server utilizing the path. Method, systems and computer program products corresponding to the network intermediaries are also provided.

60 Claims, 5 Drawing Sheets

METHODS SYSTEMS AND COMPUTER PROGRAM PRODUCTS FOR PROVIDING SECURE CLIENT PROFILE COMPLETION BY NETWORK INTERMEDIARIES

FIELD OF THE INVENTION

The present invention relates to client profiles and more particularly relates to the security of client profile information.

BACKGROUND OF THE INVENTION

With the increase in customized information provided to clients by servers, there has also been an increase in the transmission of client information from the client to the server. A server may utilize client information, among other things, to tailor content which is provided to the client. For example, if the server is informed of the location of a client, then the server may provide content to the client based on that location. Similarly, if the client informs the server of the network through which it is connected, then the server may utilize this information to provide network specific information to the client.

As an example, if a mobile client is connected to a network in, for example, Research Triangle Park, North Carolina, in the United States, then, if the client provides profile information to the server identifying its location as in North Carolina, information about North Carolina may be provided to the client by a server. If the client is then later connected to the server through a network in Tokyo, Japan, and the client provides profile information to the server identifying its location as being in Tokyo, then the server may provide information about Tokyo to the client.

Various methods exist by which a client may communicate its preferences and capabilities to a server. For example, information may be embedded within a Hyper-Text Transport Protocol (HTTP) user-agent field, or it may be embedded within a Universal Resource Locator (URL) itself. Emerging standards such as the W3C Composite Capability/Preference Profile (CC/PP) standard and the WAP Forum's User-Agent Profiles standard similarly define formats by which information may be embedded by the client in HTTP requests.

However, it is not always the case that information which may be required by the server to support such capabilities is actually available to the client. For example, the client may not have the location information which is to be provided to the server. This may occur if the client is not associated with a Global Positioning System (GPS). Therefore, the client may be unable by itself to provide such location information to the server. However, such information may be available to a network intermediary, i.e. a data processing system in the path between the client and the server. While the network intermediary may have such information, the network intermediary may need to be informed that such information should be passed on to the server as part of the client's profile. However, legal considerations may prevent a network intermediary, such as a service provider, from providing information to a third party service without the end user's explicit permission. Thus, the client may need to explicitly inform the network intermediary to pass its location information on to the server.

One issue which may arise when network intermediaries provide information on behalf of a client is security. Because information is not being provided directly by the client, it may be necessary to determine the authenticity of such information and to assure that the information is not be provided by someone posing as the client. However, privacy protocols, such as the Platform for Privacy Preferences Project (P3P), operate end-to-end between the client and the server and, therefore, may be unsuitable for providing authorization to network intermediaries to provide information about a client to a server. Accordingly, a need exists for improvements in the security of how client profile information is provided to servers.

SUMMARY OF THE INVENTION

Embodiments of the present invention include methods, systems and computer program products which provide profile information associated with a client to a server by generating, at the client, a profile document containing profile information associated with the client and incorporating in the profile document a designator which indicates that profile information identified by the designator is not provided by the client and is provided by a network intermediary in a path between the client and the server. The designator in the profile document is encrypted utilizing a key associated with the client and the profile document with the encrypted designator transmitted from the client to the server utilizing the path.

In particular embodiments of the present invention, the designator incorporated into the profile document comprises a profile information identifier which identifies a type of profile information in the profile document and a wildcard designator associated with the profile information identifier which indicates that the type of profile information associated with the profile information identifier is provided by a network intermediary in the path between the client and the server. Furthermore, the encryption of the designator may be provided by encrypting the wildcard designator utilizing a private key associated with the client to provide the encrypted designator.

In additional embodiments of the present invention, the wildcard designator comprises a client identification associated with the client, a token and an encrypted value. In such embodiments, the encryption of the wildcard designator may be accomplished by encrypting the token so as to provide the encrypted value. Alternatively, the token and a predefined character string may be encrypted. The token may be a randomly generated value.

In still further embodiments of the present invention, the designator is encrypted by encrypting the wildcard designator and the profile information identifier utilizing a private key associated with the client to provide the encrypted designator. In such embodiments, the wildcard designator may be a client identification associated with the client, a token and an encrypted value. Encrypting the wildcard designator and the profile information identifier may then be accomplished by encrypting the token and the profile information identifier so as to provide the encrypted value. Furthermore, the encryption of the token and the profile information identifier may be provided by encrypting the token, the profile information identifier and a predefined character string. In a still further embodiment of the present invention, the designator is encrypted utilizing a public key of the network intermediary.

In other embodiments of the present invention, the profile document transmitted by the client is received at the network intermediary. The network intermediary decrypts the designator incorporated in the received profile document, incorporates the profile information identified by the designator into the profile document to provide a modified profile document and transmits the modified profile document to the server.

In yet other embodiments of the present invention, methods, systems and computer program products may provide client profile information to a server, by receiving, at a network intermediary, a profile document from a client for forwarding to the server. The network intermediary determines if a portion of the profile document is encrypted and decrypts the encrypted portion of the profile document. The decrypted portion of the profile document is parsed to determine if a designator is provided in the decrypted portion of the profile document which indicates that profile information identified by the designator is to be incorporated into the profile document by the network intermediary. If so, the network intermediary incorporates the identified profile information in the profile document so as to provide a modified profile document and transmits the modified profile document to the server.

In further embodiments, the designator incorporated into the profile document comprises a profile information identifier which identifies a type of profile information in the profile document and a wildcard designator associated with the profile information identifier which indicates that the type of profile information associated with the profile information identifier is provided by the network intermediary. In additional embodiments, decrypting the designator may be carried out by decrypting the encrypted portion of the document profile utilizing a private key associated with the client to provide the designator.

In still further embodiments, the wildcard designator may be a client identification associated with the client, a token and an encrypted value. In such a case, the encrypted portion of the document profile may be decrypted by decrypting the encrypted value. Furthermore, the token may be a randomly generated value.

In yet other embodiments of the present invention, the encrypted portion of the document profile may be decrypted by decrypting the encrypted portion of the profile document to provide a wildcard designator and the profile information identifier utilizing a private key associated with the client to provide the decrypted designator.

Furthermore, the encrypted portion of the document profile may also be decrypted utilizing a private key of the network intermediary.

While the invention has been described above primarily with respect to the method aspects of the invention, both systems and/or computer program products are also provided.

DETAILED DESCRIPTION OF PREFERRED EMBODIMENTS

Figure 1:
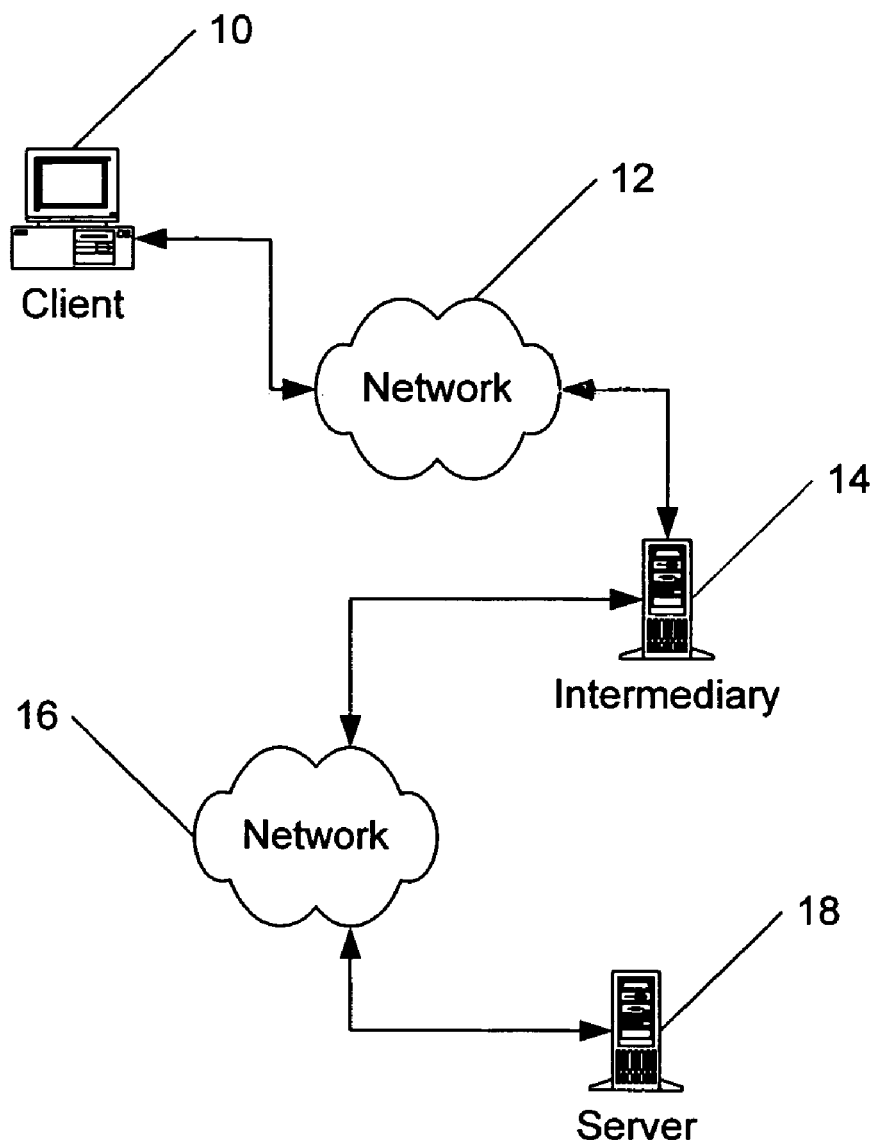
FIG. 1 is a block diagram of a client-server system according to embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by those of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to an embodiment of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

As is described in more detail below, the present invention provides security in the generation of profile information by network intermediaries. Such security is provided by encrypting information in a client profile document which specifies that the network intermediary is to provide the client profile information. Embodiments of the present invention may be utilized in systems such as those described in concurrently filed and commonly assigned United States Patent Application entitled "Method and System for Designating Required Device Attributes for Embedding in a World-Wide Web Document Request,", the disclosure of which is incorporated herein by reference as if set forth fully herein.

Various embodiments of the present invention will now be described with reference to FIGS. 1 through 5. FIG. 1 illustrates a network environment in which embodiments of the present invention may be utilized. As seen in FIG. 1, a client data processing system 10, such as a personal computer, laptop computer, pervasive computing device such as a personal data assistant (PDA), smartphone, or other mobile terminal, communicates over networks 12 and 16 to another data processing system which acts as a server 18. In the communications between the client 10 and the server 18, there may be a data processing system which acts as a network intermediary 14 and which receives messages from the client 10 and forwards the messages on to the server 18. Examples of such network intermediaries 14 include proxy servers, gateway servers or service providers, however, any data processing system that receives messages from the client 10 and forwards them to the server 18 may be considered a network intermediary 14 as that term is used herein.

Figure 2:
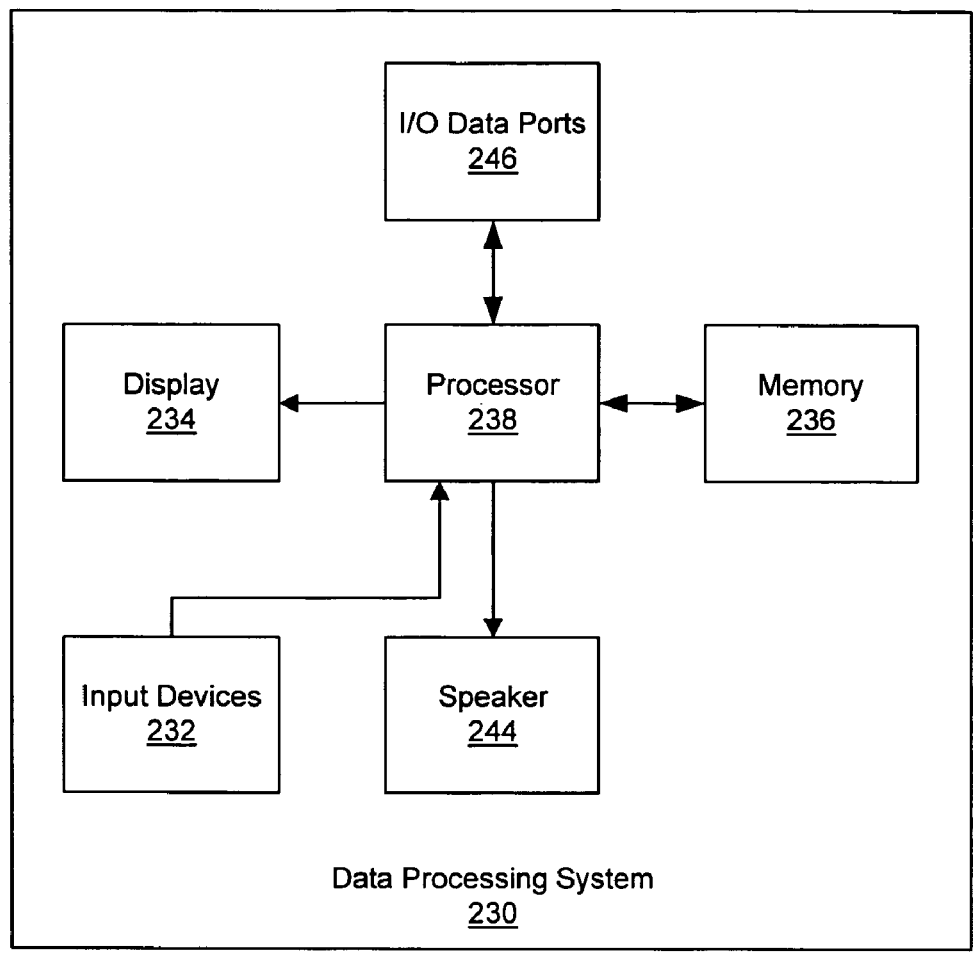
FIG. 2 is a block diagram of a data processing system according to embodiments of the present invention.

Referring now to FIG. 2, an exemplary embodiment of a data processing system 230 in accordance with embodiments of the present invention typically includes input device(s) 232 such as a keyboard or keypad, a display 234, and a memory 236 that communicate with a processor 238. The data processing system 230 may further include a speaker 244, and an I/O data port(s) 246 that also communicates with the processor 238. The I/O data port 246 can be used to transfer information between the data processing system 230 and another computer system or a network (e.g., the Internet). These components may be conventional components such as those used in many conventional pervasive computing devices which may be configured to operate as described herein. Furthermore, as will be appreciated by those of skill in the art, the data processing system 230 may be configured as the client 10, the network intermediary 14 or the server 18.

Figure 3:
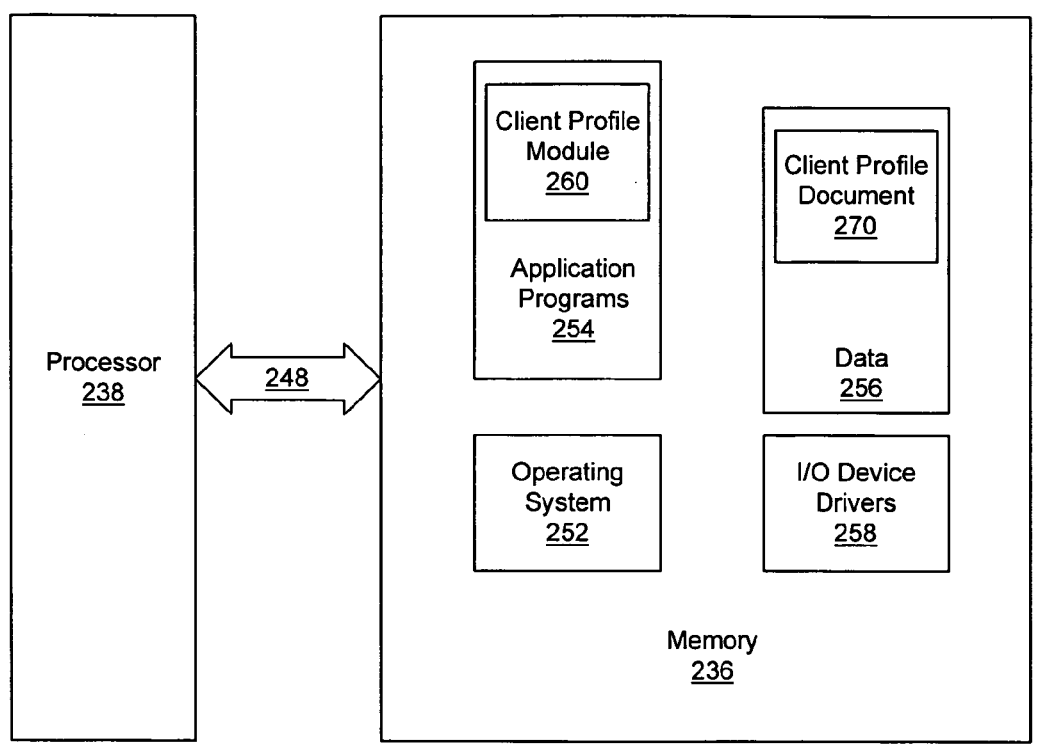
FIG. 3 is a more detailed block diagram of data processing systems according to embodiments of the present invention.

FIG. 3 is a block diagram of embodiments of data processing systems that illustrates systems, methods, and computer program products in accordance with the present invention. The processor 238 communicates with the memory 236 via an address/data bus 248. The processor 238 can be any commercially available or custom microprocessor. The memory 236 is representative of the overall hierarchy of memory devices containing the software and data used to implement the functionality of the data processing system 230. The memory 236 can include, but is not limited to, the following types of devices: cache, ROM, PROM, EPROM, EEPROM, flash memory, SRAM, and DRAM.

As shown in FIG. 3, the memory 236 may include several categories of software and data used in the data processing system 230: the operating system 252; the application programs 254; the input/output (I/O) device drivers 258; and the data 256. As will be appreciated by those of skill in the art, the operating system 252 may be any operating system suitable for use with a data processing system, such as OS/2, AIX or System390 from International Business Machines Corporation, Armonk, N.Y., Windows95, Windows98 or Windows2000 from Microsoft Corporation, Redmond, Wash., Unix or Linux. The I/O device drivers 258 typically include software routines accessed through the operating system 252 by the application program 254 to communicate with devices such as the input devices 232, the display 234, the speaker 244, the I/O data port(s) 246, and certain memory 236 components. The application programs 254 are illustrative of the programs that implement the various features of the data processing system 230 and preferably include at least one application which may utilize the secure profile aspects of embodiments of the present invention. Finally, the data 256 represents the static and dynamic data used by the application programs 254, the operating system 252, the I/O device drivers 258, and other software programs that may reside in the memory 236.

As is further seen in FIG. 3, the application programs 254 preferably include a client profile module 260. The client profile module 260 preferably carries out operations as described herein for providing secure profile information from network intermediaries. As such, the client profile module may be different depending on whether the system illustrated in FIG. 3 is the client 10 or a network intermediary 14. Alternatively, a single client profile module 260 may be utilized for both the client 10 and the network intermediary 14. Furthermore, the data portion of memory 236 preferably includes a client profile document 270 which provides the client profile information and which may be transmitted from the client 10 through the network intermediary 14 to the server 18. Preferably, at least a portion of the client profile document 270 is encrypted when transmitted from the client 10 to the network intermediary 14.

While the present invention is illustrated, for example, with reference to a separate client profile module 260, as will be appreciated by those of skill in the art, the client profile module 260 may also be incorporated into the operating system 252. Thus, the present invention should not be construed as limited to the configuration of FIG. 3 but is intended to encompass any configuration capable of carrying out the operations described herein.

Figure 4:
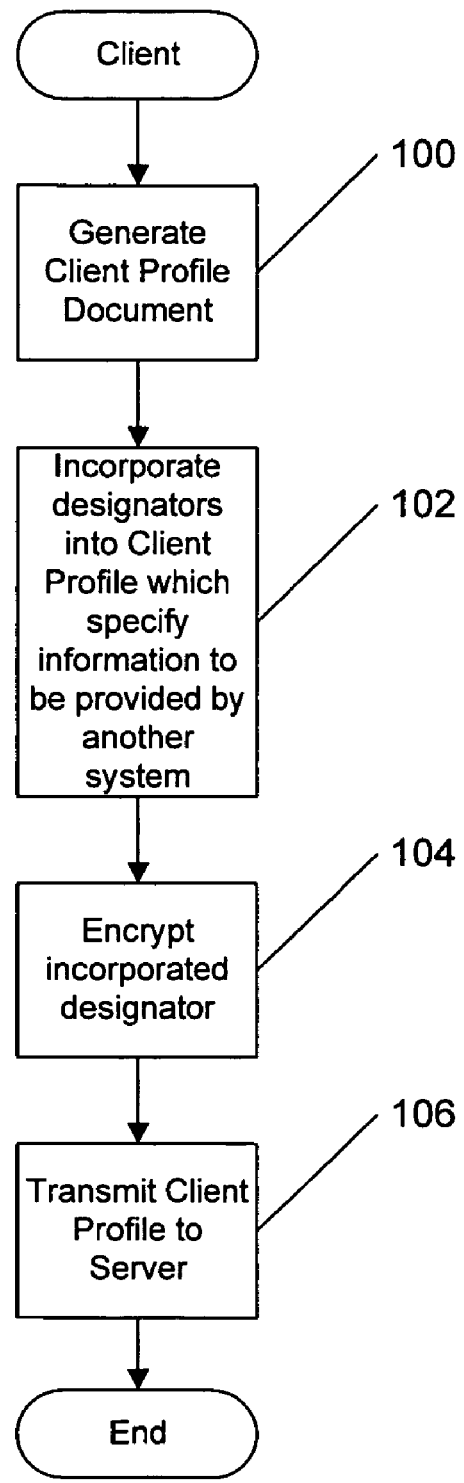
FIG. 4 is a flowchart illustrating operations of a client according to embodiments of the present invention.

Embodiments of the present invention will now be described in more detail with reference to FIGS. 4 and 5 which are flowchart illustrations of operations carried out by the client 10 and the network intermediary 14 according to embodiments of the present invention. As seen in FIG. 4, the client 10 generates a client profile document (block 100). The client profile document may be transmitted with a HTTP request and may be any agreed upon format. For example, the client profile document may be a cookie, a Hyper-Text Markup Language (HTML) document, Extensible Markup Language (XML) document or other such language document or it may be a document in any suitable predefined format. The format of the particular client profile document may depend on the format expected by the server 18. While the client profiles are described as a "document" herein, as will be appreciated by those of skill in the art, a document is utilized herein to refer to a collection of profile information sent from the client 10 to the server 18.

As is further seen in FIG. 4, the client 10 incorporates designator(s) into the client profile document which specify information to be provided by a network intermediary 14 (block 102). The designator incorporated into the client profile document authorizes the particular property specified by the designator to be provided by a network intermediary 14, such as a proxy server, gateway server or service provider. As an example, the designator may include a wildcard identifier, such as "$OPEN", which specifies that the associated property is to be provided by a network intermediary 14. In such embodiments a client profile document may contain the following:

<rdf:Description>
  <prf:BearerNetwork>SMS</prf:BearerNetwork>
  <prf:Bandwidth>9600</prf:Bandwidth>
  <prf:Location>$OPEN</prf:Location>
</rdf:Description>

The $OPEN wildcard specifies that the Location information maybe provided by a network intermediary 14.

As is seen above, the client profile document preferably includes as part of the designator a profile information identifier which identifies the information to be provided by the network intermediary 14. For example, the <prf:Location> . . . </prf:Location> sequence in the above example provides an identification that location information is to be provided by the network intermediary 14.

While incorporation of the designator in the client profile document may specify what information is to be provided by a network intermediary, merely providing the designator may allow improper authorization by someone posing as a client and authorizing a network intermediary to incorporate information about the client in the client profile document. However, as is seen in FIG. 4, the designator may be encrypted by the client 10 (block 104) and the client profile document transmitted to the server with the encrypted designator (block 106). By encrypting the designator, the client may "sign" the designator, such that network intermediaries can be assured that the client generated the request that information be incorporated into the profile by the network intermediary. Thus, the problem of an unauthorized user obtaining client profile information from a network intermediary may be reduced.

Differing embodiments of the present invention may encrypt the designator in different manners. For example, in one embodiment, the client signs the wildcard "$OPEN" utilizing its own private key. Furthermore, the wildcard may be changed from "$OPEN" to include client information and/or randomly generated information. For example, the wildcard may take the form of:

<OPEN ID="Client ID" Random="12391321">[VAL]</OPEN> where ID is a client identification, Random is a randomly generated token and [VAL] contains the randomly generated token encrypted using the private key of the client. Optionally, a character string could be incorporated with the token for encryption. For example, the token may be concatenated with the string "$OPEN" and then encrypted with the client's private key.

In still further embodiments of the present invention, the entire profile sequence may be encrypted. Thus, in the above example, the <prf:Location> . . . </prf:Location> sequence may be encrypted. This may prevent someone from tampering with the request by, for example, changing the requested client property. The requested property may also be incorporated into [VAL] by encrypting the token with the identifier of the property. For example, the token may be encrypted with <prf:Location>$OPEN</prf:Location>

As will be appreciated by those of skill in the art, only a portion of the identifier need be encrypted. Furthermore, various other encryption and/or designator formats may be utilized while still benefitting from the teachings of the present invention.

In still further embodiments of the present invention, the client may specify which network intermediary is to be authorized to provide the client information by, for example, further encrypting the designator, such as the "<OPEN . . . >" sequence described above, with a public key of the network intermediary 14. This may reduce the chance of fraud by ensuring that only the authorized network intermediary may know which attribute is requested.

Figure 5:
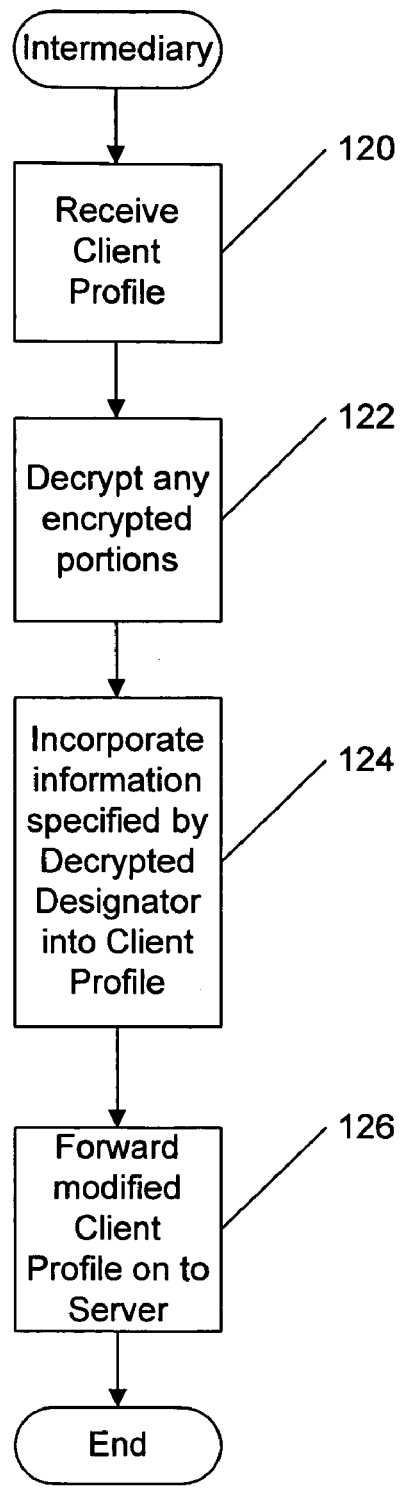
FIG. 5 is a flowchart illustrating operations of a network intermediary according to embodiments of the present invention.

FIG. 5 illustrates operations of a network intermediary 14 according to embodiments of the present invention. As seen in FIG. 5, the network intermediary 14 receives the client profile document (block 120) by, for example, receiving a HTTP request containing the client profile document. The network intermediary 14 then evaluates the client profile document and decrypts any encrypted portions of the client profile document (block 122). If portions of the client profile document are encrypted with the public key of the network intermediary 14, then the network intermediary 14 utilizes its private key to first decrypt portions of the client profile document encrypted with its public key. Otherwise, the network intermediary 14 may utilize its copy of the public key associated with the client specified in the <OPEN . . . > field of the client profile document to decrypt the [VAL] portion of the field.

If the decryption is successful and the network intermediary is capable of providing the requested information, then the network intermediary 14 then incorporates the requested information into the client profile document (block 124). Such incorporation may take the form of replacing the <OPEN . . . > field with a field specifying the requested information. Optionally, this information may then be encrypted if further security is required. In any event, the network intermediary 14 may forward the modified client profile document on to the server (block 126). Furthermore, the network intermediary 14 may archive the received <OPEN . . . > field so as to be able to prove at a later date that the incorporation of the client profile information was authorized by the client.

The flowcharts and block diagrams of FIGS. 1 through 5 illustrate the architecture, functionality, and operation of a possible implementation providing access to cryptographic functions from a common source according to the present invention. In this regard, each block in the flow charts represents a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may in fact be executed substantially concurrently or the blocks may sometimes be executed in the reverse order, depending upon the functionality involved. Thus, while the present invention is described as first generating a client profile document, then incorporating designators and encrypting the designators, as will be appreciated by those of skill in the art, the generation, incorporation and encryption may be carried out as a single operation or combination of operations. Accordingly, the present invention should not be construed as limited to discrete operations but should be construed as teaching the results of the operations irrespective of the division of actions which produced such results.

While the present invention has been described with reference to information which is not available to a client, as will be appreciated by those of skill in the art in light of the present disclosure, information may be provided by a network intermediary for other reasons. For example, the information may be available to a client, however, the bandwidth of the client connection may be such that sending the information from a network intermediary may be more efficient.

Furthermore, the present invention has been described with reference to HTTP requests, however, the present invention may be applicable to any protocol having an intermediary data processing system which may provide information specified by a protocol field on behalf of a client to a server. Thus, the present invention should not be construed as limited to HTTP embodiments of the present invention described in detail herein.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of providing profile information associated with a client to a server, the method comprising the steps of:
   generating, at the client, a profile document containing profile information associated with the client;
   incorporating in the profile document a designator which indicates that profile information identified by the designator is not provided by the client and is provided by a network intermediary in a path between the client and the server; and
   transmitting the profile document with the designator from the client to the server utilizing the path so as to provide to the server a modified profile document containing information incorporated in the profile document at the client and information incorporated in the profile document by the network intermediary.

2. A method according to claim 1, wherein the designator incorporated into the profile document comprises a profile information identifier which identifies a type of profile information in the profile document and a wildcard designator associated with the profile information identifier which indicates that the type of profile information associated with the profile information identifier is provided by a network intermediary in the path between the client and the server.

3. A method according to claim 1, further comprising the step of encrypting the designator in the profile document utilizing a key associated with the client.

4. A method according to claim 3, wherein the step of encrypting the designator comprises the step of encrypting the wildcard designator utilizing a private key associated with the client to provide the encrypted designator.

5. A method according to claim 4, wherein the wildcard designator comprises a client identification associated with the client, a token and an encrypted value and wherein the step of encrypting the wildcard designator comprises the step of encrypting the token so as to provide the encrypted value.

6. A method according to claim 5, wherein the step of encrypting the token further comprises the step of encrypting the token and a predefined character string.

7. A method according to claim 5, wherein the token is a randomly generated value.

8. A method according to claim 3, wherein the step of encrypting the designator comprises the step of encrypting the wildcard designator and the profile information identifier utilizing a private key associated with the client to provide the encrypted designator.

9. A method according to claim 8, wherein the wildcard designator comprises a client identification associated with the client, a token and an encrypted value and wherein the step of encrypting the wildcard designator and the profile information identifier comprises the step of encrypting the token and the profile information identifier so as to provide the encrypted value.

10. A method according to claim 8, wherein the step of encrypting the token and the profile information identifier further comprises the step of encrypting the token, the profile information identifier and a predefined character string.

11. A method according to claim 10, wherein the token is a randomly generated value.

12. A method according to claim 1, further comprising the step of encrypting the designator utilizing a public key of the network intermediary.

13. A method according to claim 3, further comprising the steps of:
   receiving the profile document transmitted by the client at the network intermediary; and
   wherein the network intermediary carries out the steps of:
   decrypting the designator incorporated in the profile document if the designator incorporated in the profile document is encrypted;
   incorporating the profile information identified by the designator into the profile document to provide a modified profile document if the network intermediary has available the profile information indentified by the designator;
   transmitting the modified profile document to the server.

14. A method of providing client profile information to a server, the method comprising the steps of:
   receiving, at a network intermediary, a profile document from a client for forwarding to the server;
   determining if a portion of the profile document is encrypted;
   decrypting the encrypted portion of the profile document;
   parsing the decrypted portion of the profile document to determine if a designator is provided in the decrypted portion of the profile document which indicates that profile information identified by the designator is to be incorporated into the profile document by the network intermediary;
   incorporating the identified profile information in the profile document so as to provide a modified profile document; and
   transmitting the modified profile document to the server.

15. A method according to claim 14, wherein the designator incorporated into the profile document comprises a profile information identifier which identifies a type of profile information in the profile document and a wildcard designator associated with the profile information identifier which indicates that the type of profile information associated with the profile information identifier is provided by the network intermediary.

16. A method according to claim 15, wherein the step of decrypting the designator comprises the step of decrypting the encrypted portion of the document profile utilizing a private key associated with the client to provide the designator.

17. A method according to claim 16, wherein the wildcard designator comprises a client identification associated with the client, a token and an encrypted value and wherein the step of decrypting the encrypted portion of the document profile comprises the step of decrypting the encrypted value.

18. A method according to claim 16, wherein the token is a randomly generated value.

19. A method according to claim 15, wherein the step of decrypting the encrypted portion of the document profile comprises the steps of:
   decrypting the encrypted portion of the profile document to provide a wildcard designator; and
   decrypting the profile information identifier utilizing a private key associated with the client to provide the decrypted designator.

20. A method according to claim 14, further comprising the step of decrypting the encrypted portion of the document profile utilizing a private key of the network intermediary.

21. A system for providing profile information associated with a client to a server, comprising:
   means for generating, at the client, a profile document containing profile information associated with the client;
   means for incorporating in the profile document a designator which indicates that profile information identified by the designator is not provided by the client and is provided by a network intermediary in a path between the client and the server; and
   means for transmitting the profile document with the designator from the client to the server utilizing the path so as to provide to the server a modified profile document containing information incorporated in the profile document at the client and information incorporated in the profile document by the network intermediary.

22. A system according to claim 21, wherein the designator incorporated into the profile document comprises a profile information identifier which identifies a type of profile information in the profile document and a wildcard designator associated with the profile information identifier which indicates that the type of profile information associated with the profile information identifier is provided by a network intermediary in the path between the client and the server.

23. A system according to claim 21, further comprising means for encrypting the designator in the profile document utilizing a key associated with the client.

24. A system according to claim 23, wherein the means for encrypting the designator comprises means for encrypting the wildcard designator utilizing a private key associated with the client to provide the encrypted designator.

25. A system according to claim 24, wherein the wildcard designator comprises a client identification associated with the client, a token and an encrypted value and wherein the means for encrypting the wildcard designator comprises means for encrypting the token so as to provide the encrypted value.

26. A system according to claim 25, wherein the means for encrypting the token further comprises means for encrypting the token and a predefined character string.

27. A system according to claim 25, wherein the token is a randomly generated value.

28. A system according to claim 23, wherein the means for encrypting the designator comprises means for encrypting the wildcard designator and the profile information identifier utilizing a private key associated with the client to provide the encrypted designator.

29. A system according to claim 28, wherein the wildcard designator comprises a client identification associated with the client, a token and an encrypted value and wherein the means for encrypting the wildcard designator and the profile information identifier comprises means for encrypting the token and the profile information identifier so as to provide the encrypted value.

30. A system according to claim 28, wherein the means for encrypting the token and the profile information identifier further comprises means for encrypting the token, the profile information identifier and a predefined character string.

31. A system according to claim 30, wherein the token is a randomly generated value.

32. A system according to claim 21, further comprising means for encrypting the designator utilizing a public key of the network intermediary.

33. A system according to claim 21, further comprising:
   means for receiving the profile document transmitted by the client at the network intermediary;
   means for decrypting the designator incorporated in the profile document if the designator is encrypted;
   means for incorporating the profile information identified by the designator into the profile document to provide a modified profile document;
   means for transmitting the modified profile document to the server.

34. A system for providing client profile information to a server, comprising:
   means for receiving, at a network intermediary, a profile document from a client for forwarding to the server;
   means for determining if a portion of the profile document is encrypted;
   means for decrypting the encrypted portion of the profile document;
   means for parsing the decrypted portion of the profile document to determine if a designator is provided in the decrypted portion of the profile document which indicates that profile information identified by the designator is to be incorporated into the profile document by the network intermediary;
   means for incorporating the identified profile information in the profile document so as to provide a modified profile document; and
   means for transmitting the modified profile document to the server.

35. A system according to claim 34, wherein the designator incorporated into the profile document comprises a profile information identifier which identifies a type of profile information in the profile document and a wildcard designator associated with the profile information identifier which indicates that the type of profile information associated with the profile information identifier is provided by the network intermediary.

36. A system according to claim 35, wherein the means for decrypting the designator comprises means for decrypting the encrypted portion of the document profile utilizing a private key associated with the client to provide the designator.

37. A system according to claim 36, wherein the wildcard designator comprises a client identification associated with the client, a token and an encrypted value and wherein the means for decrypting the encrypted portion of the document profile comprises means for decrypting the encrypted value.

38. A system according to claim 36, wherein the token is a randomly generated value.

39. A system according to claim 35, wherein the means for decrypting the encrypted portion of the document profile comprises:
   means for decrypting the encrypted portion of the profile document to provide a wildcard designator; and
   means for decrypting the profile information identifier utilizing a private key associated with the client to provide the decrypted designator.

40. A system according to claim 34, further comprising means for decrypting the encrypted portion of the document profile utilizing a private key of the network intermediary.

41. A computer program product for providing profile information associated with a client to a server, comprising:
   a computer-readable storage medium having computer-readable program code embodied in said medium, said computer-readable program code comprising: computer readable program code which generates, at the client, a profile document containing profile information associated with the client;
   computer readable program code which incorporates in the profile document a designator which indicates that profile information identified by the designator is not provided by the client and is provided by a network intermediary in a path between the client and the server; and
   computer readable program code which transmits the profile document with the designator from the client to the server utilizing the path so as to provide to the server a modified profile document containing information incorporated in the profile document at the client and information incorporated in the profile document by the network intermediary.

42. A computer program product according to claim 41, wherein the designator incorporated into the profile document comprises a profile information identifier which identifies a type of profile information in the profile document and a wildcard designator associated with the profile information identifier which indicates that the type of profile information associated with the profile information identifier is provided by a network intermediary in the path between the client and the server.

43. A computer program product according to claim 41, further comprising computer readable program code which encrypts the designator in the profile document utilizing a key associated with the client.

44. A computer program product according to claim 43, wherein the computer readable program code which encrypts the designator comprises computer readable program code which encrypts the wildcard designator utilizing a private key associated with the client to provide the encrypted designator.

45. A computer program product according to claim 44, wherein the wildcard designator comprises a client identification associated with the client, a token and an encrypted value and wherein the computer readable program code which encrypts the wildcard designator comprises computer readable program code which encrypts the token so as to provide the encrypted value.

46. A computer program product according to claim 45, wherein the computer readable program code which encrypts the token further comprises computer readable program code which encrypts the token and a predefined character string.

47. A computer program product according to claim 45, wherein the token is a randomly generated value.

48. A computer program product according to claim 43, wherein the computer readable program code which encrypts the designator comprises computer readable program code which encrypts the wildcard designator and the profile information identifier utilizing a private key associated with the client to provide the encrypted designator.

49. A computer program product according to claim 48, wherein the wildcard designator comprises a client identification associated with the client, a token and an encrypted value and wherein the computer readable program code which encrypts the wildcard designator and the profile information identifier comprises computer readable program code which encrypts the token and the profile information identifier so as to provide the encrypted value.

50. A computer program product according to claim 48, wherein the computer readable program code which encrypts the token and the profile information identifier further comprises computer readable program code which encrypts the token, the profile information identifier and a predefined character string.

51. A computer program product according to claim 49, wherein the token is a randomly generated value.

52. A computer program product according to claim 41, further comprising computer readable program code which encrypts the designator utilizing a public key of the network intermediary.

53. A computer program product according to claim 41, further comprising:
   computer readable program code which receives the profile document transmitted by the client at the network intermediary;
   computer readable program code which decrypts the designator incorporated in the profile document if the designator is encrypted;
   computer readable program code which incorporates the profile information identified by the designator into the profile document to provide a modified profile document;
   computer readable program code which transmits the modified profile document to the server.

54. A computer program product for providing client profile information to a server, comprising:
   a computer-readable storage medium having computer-readable program code embodied in said medium, said computer-readable program code comprising:
   computer readable program code which receives, at a network intermediary, a profile document from a client for forwarding to the server;
   computer readable program code which determines if a portion of the profile document is encrypted;
   computer readable program code which decrypts the encrypted portion of the profile document;
   computer readable program code which parses the decrypted portion of the profile document to determine if a designator is provided in the decrypted portion of the profile document which indicates that profile information identified by the designator is to be incorporated into the profile document by the network intermediary;
   computer readable program code which incorporates the identified profile information in the profile document so as to provide a modified profile document; and
   computer readable program code which transmits the modified profile document to the server.

55. A computer program product according to claim 54, wherein the designator incorporated into the profile document comprises a profile information identifier which identifies a type of profile information in the profile document and a wildcard designator associated with the profile information identifier which indicates that the type of profile information associated with the profile information identifier is provided by the network intermediary.

56. A computer program product according to claim 55, wherein computer readable program code which decrypts the designator comprises computer readable program code which decrypts the encrypted portion of the document profile utilizing a private key associated with the client to provide the designator.

57. A computer program product according to claim 56, wherein the wildcard designator comprises a client identification associated with the client, a token and an encrypted value and wherein computer readable program code which decrypts the encrypted portion of the document profile comprises computer readable program code which decrypts the encrypted value.

58. A computer program product according to claim 56, wherein the token is a randomly generated value.

59. A computer program product according to claim 55, wherein the computer readable program code which decrypts the encrypted portion of the document profile comprises:

computer readable program code which decrypts the encrypted portion of the profile document to provide a wildcard designator; and computer readable program code which decrypts the profile information identifier utilizing a private key associated with the client to provide the decrypted designator.

60. A computer program product according to claim 54, further comprising computer readable program code which decrypts the encrypted portion of the document profile utilizing a private key of the network intermediary.

* * * * *